March 21, 1939.　　M. A. CASSILETH　　2,151,587
DOOR HANDLE LOCK
Filed Nov. 2, 1938

Morris A. Cassileth,
INVENTOR

BY *Victor J. Evans & Co.*
ATTORNEYS

Patented Mar. 21, 1939

2,151,587

UNITED STATES PATENT OFFICE 2,151,587

DOOR HANDLE LOCK

Morris A. Cassileth, Brooklyn, N. Y., assignor of one-half to Lee H. Cassileth, Brooklyn, N. Y.

Application November 2, 1938, Serial No. 238,451

4 Claims. (Cl. 292—288)

My invention relates to retaining devices adapted to prevent the accidental opening of the door of a vehicle or the like.

An important object of my invention is to provide a retaining device adapted to engage the handles of the front and rear doors of an automobile and to effectively limit the opening of the same.

Another object of my invention is to provide a retaining device that is resilient in its action to permit the proper adjustment of the device.

Yet another object of my invention is to provide a retaining device that is simple in construction, efficient in operation, and inexpensive to manufacture.

Other objects and advantages of my invention will be apparent during the course of the following description.

Figure 1:
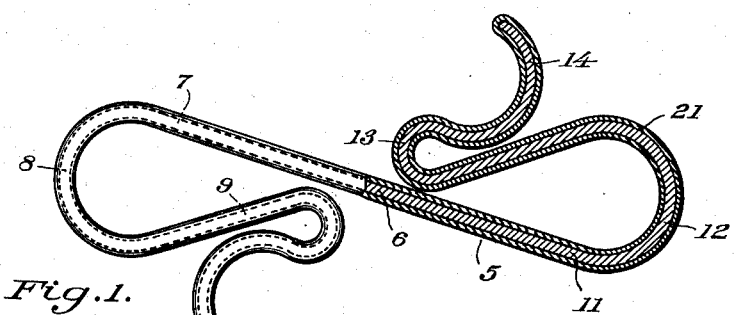
Figure 2:
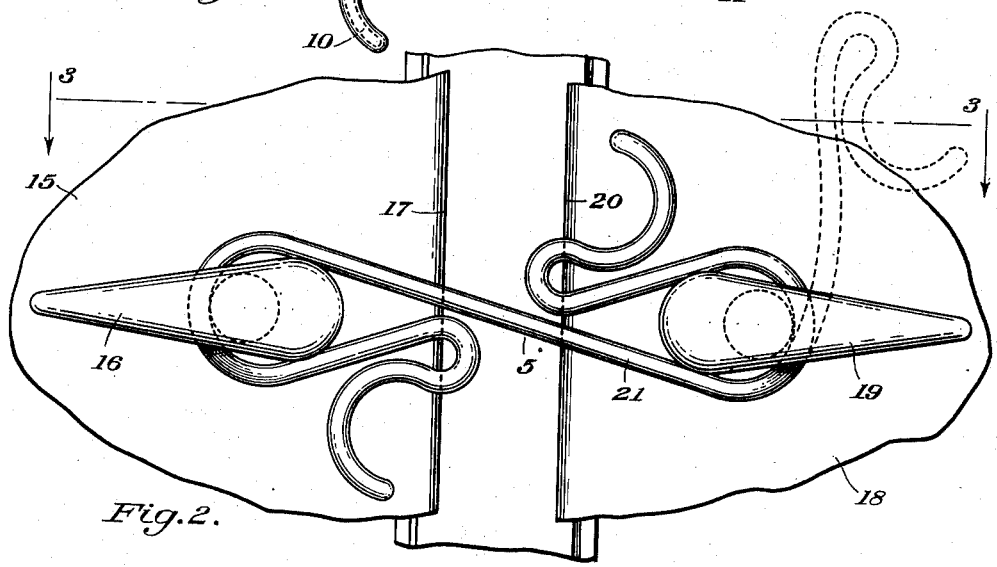
Figure 3:
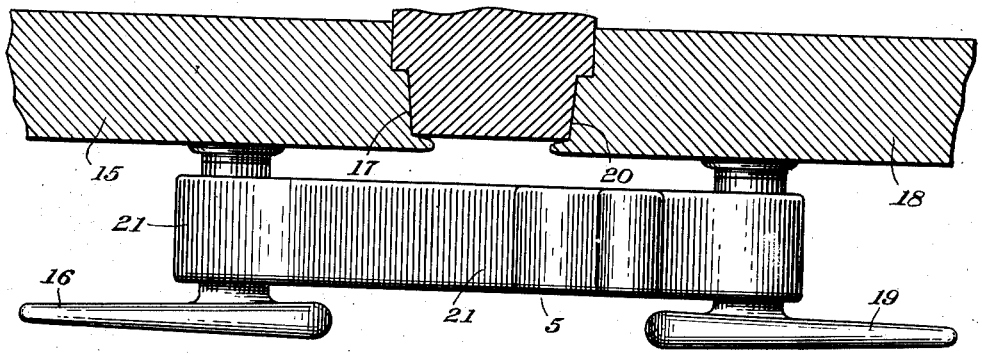

In the accompanying drawing forming a part of this specification and in which like numerals are employed to designate like parts throughout the same, Figure 1 is a plan view, partly in section, of a device embodying my invention, Figure 2 is a view showing my device in operative association with the handles of an automobile vehicle or the like, Figure 3 is a transverse sectional view taken on the line 3—3 of Figure 2.

In the drawing, wherein for the purpose of illustration is shown a preferred embodiment of my invention, the numeral 5 designates the flat resilient plate member from which my device is made. The plate 5 is provided with a substantially straight middle portion 6, being bent upon itself at the end 7 to provide a loop 8. The extending end 9 of the loop 8 is bent outwardly and back upon itself terminating in an outwardly curved portion 10 forming a means whereby the operator can easily grasp the same. The opposite end 11 of the plate member 5 is bent upon itself in the opposite direction from the end 7 to form the loop 12 which is provided with an extension 13 which is bent back upon itself and terminates in an outwardly curved portion 14 to provide a means whereby the operator can easily grasp the same.

I have provided the steel plate 5 with an exterior coating 21 of hard rubber or similar compound to protect the user's hands while manipulating the device, and to prevent the metallic parts from contacting the door handles in a manner to scratch or substantially deface the same.

The operation of my device is most clearly illustrated in Figure 2 of the drawing wherein the numeral 15 designates the front door of an automobile with the conventional handle 16 attached thereto adjacent its rear edge 17, and the numeral 18 designates the rear door of an automobile having the usual handle 19 attached thereto adjacent its front edge 20.

It often happens that when small children are in a moving vehicle, they accidentally operate the handle of the doors and when the same swings open they are thrown from the car and often suffer severe consequences therefrom. My device is adapted to prevent this by reason of its resilient action and unique shape whereby it may be slipped over the shanks of the handles as illustrated in Figures 2 and 3 of the drawing.

The plate 5 is of sufficient resiliency in its action to properly limit the opening of the doors but is flexible enough to permit the bending of the same into a position as illustrated by the dotted lines in Figure 2, thereby permitting the device to be easily slipped over the handles. The ends 10 and 14 provide convenient portions that may be easily gripped in performing this operation.

It is to be understood that the form of my invention herewith shown and described is to be taken as a preferred example of the same and that various changes in the size and shape may be resorted to without departing from the spirit of my invention or the scope of the sub-joined claims.

Having thus described my invention, I claim:

1. A door fastening device comprising a resilient clip formed with looped ends adapted to embrace the handles of a motor vehicle, and means integral therewith forming hand grips.

2. A door fastening device comprising a resilient member formed with oppositely looped ends adapted to embrace the front and rear handles of a motor vehicle.

3. A door fastening device comprising a resilient member formed with oppositely looped ends adapted to embrace the front and rear handles of a motor vehicle, said loops terminating in outwardly projecting portions forming hand grips.

4. A door fastening device comprising a resilient member formed with oppositely looped ends adapted to embrace the front and rear handles of a motor vehicle, said loops terminating in outwardly projecting portions forming hand grips, and a protective covering for the said fastening device to prevent the same from scratching the said handles.

MORRIS A. CASSILETH.